Aug. 23, 1960  W. O. FERRON  2,949,777
LIQUID LEVEL GAUGE
Filed April 15, 1957

TYPICAL SCALES

SECTION a-a

WILLIAM O. FERRON INVENTOR.

BY Robert L. Danehower
Attorney

United States Patent Office 2,949,777
Patented Aug. 23, 1960

2,949,777

LIQUID LEVEL GAUGE

William O. Ferron, Grosse Ile, Mich., assignor to Pennsalt Chemicals Corporation, a corporation of Pennsylvania Filed Apr. 15, 1957, Ser. No. 652,956

2 Claims. (Cl. 73—321)

This application is directed to an indicating tank gauge in which the liquid level in the tank is indicated at a vertically remote point by means of mirrors.

The advantages and objects of the present invention will be seen from the following description taken in conjunction with the drawings in which:

Figure 1(a) is a fragmentary view showing cross section of the liquid level gauge channel box as indicated by the cross section lines a—a in Figure 1;

Figure 1(b) is illustrative of the type of tank calibrations that would form part of the liquid level gauge.

Figure 1:
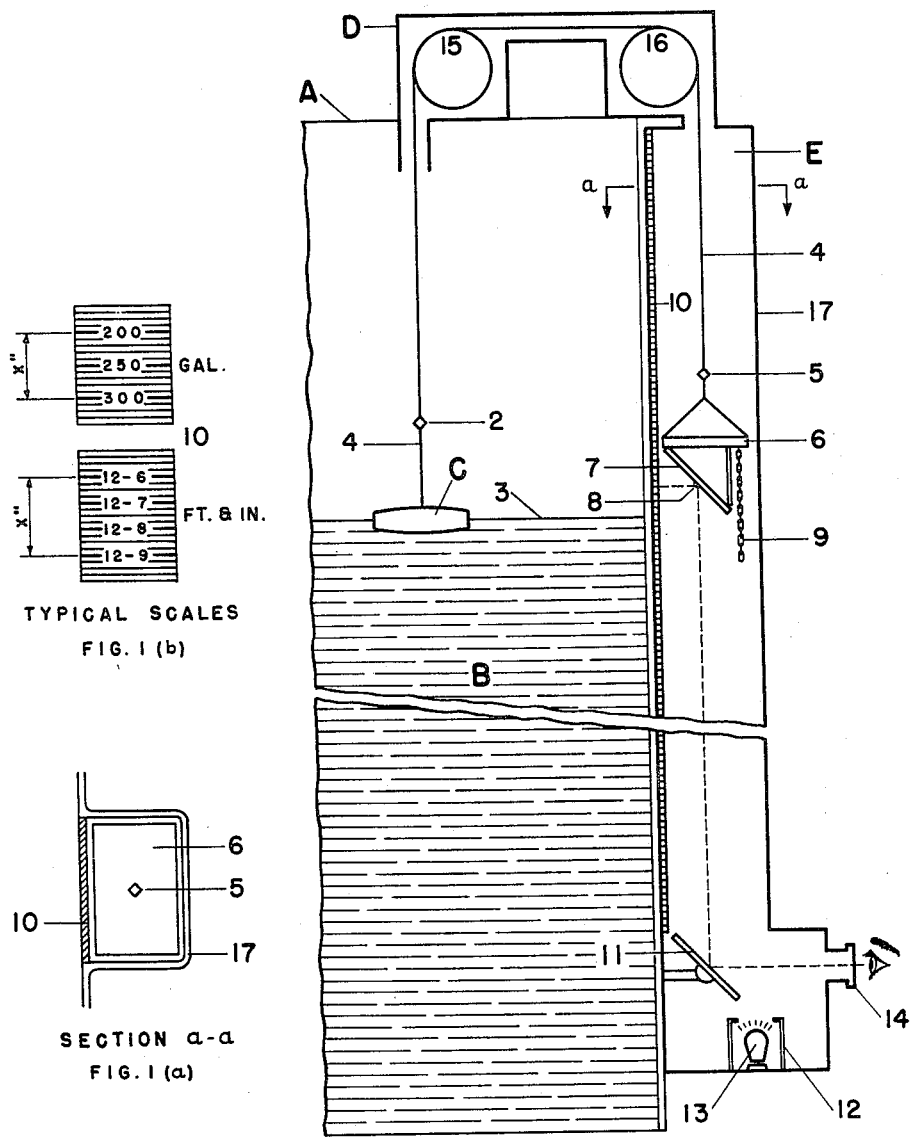
Figure 1 is in the form of an elevation, partly in section, showing an embodiment of the device mounted on a tank in position for observing the level of the liquid in the tank.

Turning now specifically to the drawing and first to Figure 1, a storage tank A such as a type suitable for storing crude oil has mounted thereon a housing D. The housing is merely to cover the pulleys and cable and to prevent weather elements from entering the tank and liquid level gauge. The tank contains a body of liquid B and floating on the surface 3 of the liquid B is a float C. A cable 4 has one end attached through swivel 2 to float C and runs over pulleys 15 and 16 in housing D and then into the liquid level gauge proper E.

The liquid level gauge proper is formed from an enclosure means E which carries the tank calibration scales 10, the light source 13, and a fixedly mounted mirror 11. The enclosure also confines the movable support 6 for the upper mirror 7 and limits its movement to a vertical plane. The enclosure means may be conveniently constructed from channel box. The other end of the cable 4 is attached to a counterweight 6 through a swivel 5. The counterweight has a mirror 7 mounted thereon on which there is embedded a cross hair 8. The cross hair facilitates the obtaining of a precise line measurement across the tank calibration scales. If a precise tank measurement is not required, the cross hair could be omitted.

Additional counterweight may be supplied in the form of a chain suspended from the counterweight 6 as shown at 9.

The mirror 7 is mounted at a 45° angle from the horizontal and views the tank calibration scale 10. The image of the calibration scale 10 is transmitted to the mirror 11 which is also mounted at 45° from the horizontal and the mirror 11 transmits the image of the scale reading through the eyepiece 14 where the image may be observed by an individual.

The enclosure means E is lighted by a suitable light for illuminating the tank calibration scales. A suitable light source is shown at 13 which is surrounded by a housing 12 with an opening therein which directs the light to the movable mirror 7.

An alternative form of my invention provides for the use of a transparent enclosure means E which would permit use of an external light source, for example, daylight. In this embodiment of my invention the use of the internal light source 13 and housing 12 would be unnecessary; or, optionally, it could be present and used only for readings when the external light was not available.

Figure 1(a) shows a cross section of the liquid level gauge proper wherein is shown the swivel 5, the channel box 17, the counterweight 6 and the scale 10. Figure 1(b) is illustrated by typical scales which may be mounted in the liquid level gauge as shown at 10.

This liquid level gauge is particularly adapted for use with tall tanks considerably higher than an individual and permits reading a low liquid level without climbing the tank or securing a ladder or other means which would otherwise be necessary in order to obtain a direct reading.

In the operation of the instrument a portion of the scale is viewed by the mirror 7. The mirror position is determined by the liquid level 3 in the tank which is linked by the float C through the cable 4. The image of the scale reading is transmitted to mirror 11 which in turn transmits the image to the eyepiece 14 where it may be observed by an individual or even a photographic instrument. The cross hair 8 mounted on mirror 7 provides means for determining its exact position in regard to the tank calibration scale. The cross hair would appear as a line across the scale showing the exact position.

While specific embodiments of the present invention have been disclosed, it will be apparent that various changes may be made such as in the sizes, proportions and arrangements of the parts without departing from the scope of the invention.

I claim:

1. A mechanism for indicating the liquid level in a tank comprising, in combination, enclosure means extended from the top to the bottom of the tank adapted to be mounted on the outside of the tank and having its long axis perpendicular to the liquid level, tank calibration means inside of the said enclosure means, a mirror fixedly mounted at the bottom of the said enclosure means positioned to receive light images along the axis of the said enclosure means, light means in the said enclosure, viewing means positioned to receive light images transmitted from the fixedly mounted mirror, a movable support member positioned inside of the said enclosure means and limited by the said enclosure means to movement in a vertical plane, a mirror mounted on the said movable support member positioned to view the said scale means and to transmit images of the scale to the said fixedly mounted mirror, cable means suspending the said movable support member at one end of the cable, pulley means to movably carry the cable means, and float means supported by the liquid in the tank and suspended from the other end of the said cable means.

2. The liquid level indicating instrument of claim 1 in which the enclosure means is constructed of transparent material.

References Cited in the file of this patent

UNITED STATES PATENTS

| 354,508 | Fraleigh | Dec. 14, 1886 |
| 1,153,553 | Johnstone | Sept. 14, 1915 |

FOREIGN PATENTS

| 443,123 | Great Britain | Aug. 9, 1935 |